United States Patent [19]

Sugahara et al.

[11] 4,205,054

[45] May 27, 1980

[54] PROCESS FOR RECOVERY OF NITRIC ACID FROM NITRATES

[75] Inventors: Yujiro Sugahara, Tokyo; Hiroyuki Naito, Tsuruoka; Kiyoshi Takai, Tsuruoka; Tatuya Kondo, Tsuruoka, all of Japan

[73] Assignee: Mizusawa Kagaku Kogyo Kabushiki Kaisha, Osaka, Japan

[21] Appl. No.: 890,910

[22] Filed: Mar. 28, 1978

[30] Foreign Application Priority Data

Mar. 28, 1977 [JP] Japan .................................. 52/33279

[51] Int. Cl.$^2$ ............................................. C01B 21/42
[52] U.S. Cl. .................................................... 423/390
[58] Field of Search ............... 423/235, 239, 390, 393, 423/400; 55/74

[56] References Cited

U.S. PATENT DOCUMENTS

| | | | |
|---|---|---|---|
| 2,737,445 | 3/1956 | Nossen | 423/390 |
| 2,757,072 | 7/1956 | Kapp et al. | 423/393 |
| 3,702,885 | 11/1972 | Markey | 423/400 |
| 3,869,543 | 3/1975 | Schutte | 423/390 |

FOREIGN PATENT DOCUMENTS

| | | | |
|---|---|---|---|
| 6905982 | 10/1970 | Netherlands | 423/400 |
| 30122 | 8/1922 | Norway | 423/400 |
| 16068 | of 1907 | United Kingdom | 423/400 |

*Primary Examiner*—G. O. Peters
*Attorney, Agent, or Firm*—Sherman & Shalloway

[57] ABSTRACT

A process for recovery of nitric acid comprising incorporating or absorbing waste nitric acid and/or a nitrate in an oil-absorbing inorganic carrier and forming a nitrate-carrier granule containing water in the form of a hydroxide, a hydrate or adsorption moisture in an amount sufficient to generate a vapor of nitric acid stably and being substantially non-sticky at a decomposition temperature of the nitrate; heating the formed granule while keeping the substantially non-sticky state in the granule to decompose the nitrate in the granule to a vapor of nitric acid; and recovering the generated vapor of nitric acid is disclosed. According to this process, nitric acid can be directly recovered from waste nitric acid or a nitrate in the form of a vapor of nitric acid without substantial generation of nitrogen oxide gases by using a cheap and easily available inorganic carrier.

10 Claims, 2 Drawing Figures

PROCESS FOR RECOVERY OF NITRIC ACID FROM NITRATES

BACKGROUND OF THE INVENTION (1) Field of the Invention:

The present invention relates to a process for recovering nitric acid directly from waste nitric acid or a nitrate, and an apparatus for practising this process. More particularly, the invention relates to a process for recovery of nitric acid comprising incorporating or absorbing waste nitric acid and/or a nitrate in an oil-absorbing inorganic carrier and forming a nitrate-carrier granule containing water in the form of a hydroxide, a hydrate or adsorption moisture in an amount sufficient to generate a vapor of nitric acid stably and being substantially non-sticky at a decomposition temperature of the nitrate; heating the formed granule while keeping the substantially non-sticky state in the granule to decompose the nitrate in the granule to a vapor of nitric acid; and recovering the generated vapor of nitric acid.

(2) Description of the Prior Art:

In various chemical and metal industries, mineral acids such as sulfuric acid are used in large quantities for various treatments. For example, a so-called sulfuric acid is known as an industrial process for the production of titanium oxide, but in such process using sulfuric acid, many problems are left unsolved in connection with prevention of environmental pollution. For example, it is said that in the sulfuric acid process for the production of titanium oxide, about 8 tons of dilute sulfuric acid (including washing water) and 3 to 4 tons of hydrous iron oxide are produced as by-products for production of 1 ton of titanium oxide. However, from the viewpoint of prevention of environmental pollution, it is not allowed to discard such dilute sulfuric acid in a river or sea, and such dilute sulfuric acid should be treated again in a particular treatment plant. It is said that the cost of the product is increased by about 15% because of this additional treatment. This disadvantage is also caused when various clay minerals or other mineral substances are acid-treated or iron or steel is washed with an acid.

Among various mineral acids, nitric acid can be distilled at a relatively low temperature and a nitrate can be thermally decomposed at a relatively low temperature. Accordingly, nitric acid can easily be recovered from waste nitric acid or a nitrate, and it may be considered that by utilizing this characteristic property of nitric acid, nitric acid will be used for various acid treatments. However, various problems must be solved when nitric acid is recovered from waste nitric acid or a nitrate.

As one of such problems, there can be mentioned the disposal of a nitrogen oxide gas, so-called $NO_x$ gas, formed at thermal decomposition of a nitrate or at distillation of waste nitric acid. This $NO_x$ gas is not satisfactorily absorbed in an absorbing liquor such as water, and in order to recover such $NO_x$ gas in the form of nitric acid, the $NO_x$ gas must be passed through a column packed with an oxidation catalyst to convert nitrogen monoxide to nitrogen dioxide, and for this treatment, the equipment must be enlarged and the treatment cost becomes high.

Another problem is adhesion of a nitrate which is molten at a relatively low temperature at the thermal decomposition of the nitrate, to the wall of a reaction vessel. This adhesion results in corrosion of the wall of the reaction vessel, and it is difficult to perform the thermal decomposition treatment of the nitrate in a continuous manner.

Waste nitric acid recovered from various acid treatments such as mentioned above contains dilute free nitric acid and a nitrate. In order to recover nitric acid in the reusable form from such waste nitric acid, it is necessary to perform troublesome steps of concentrating waste nitric acid to separate a part of free nitric acid in the form of the $NO_x$ gas and thermally decomposing the nitrate-containing residue. At the step of the thermal decomposition of the nitrate, it is molten prior to or on decomposition, and the nitric acid component is recovered in the form of the $NO_x$ gas. Accordingly, occurrence of the above-mentioned disadvantages cannot be avoided.

SUMMARY OF THE INVENTION

We found that when waste nitric acid and/or a nitrate is incorporated or absorbed in an oil-absorbing inorganic carrier to form a nitrate-carrier granule containing water in the form of a hydroxide, a hydrate or adsorption moisture in an amount sufficient to generate a vapor of nitric acid stably and being substantially non-sticky at the thermal decomposition temperature of the nitrate, it is possible to thermally decompose the nitrate in the granule while keeping the granule in the non-sticky state, namely in the original state, and to recover the nitric acid component directly in the form of a vapor of nitric acid without substantial generation of the $NO_x$ gas.

It is therefore a primary object of the present invention to provide a process in which nitric acid can be directly recovered from waste nitric acid or a nitrate in the form of a vapor of nitric acid without substantial generation of the $NO_x$ gas by using a cheap and easily available inorganic carrier.

Another object of the present invention is to provide a process in which waste nitric acid or a nitrate is fixed in the form of a granule which can easily be handled and the contained nitrate is thermally decomposed to a vapor of nitric acid while keeping the granule in the non-sticky state.

Still another object of the present invention is to provide a process in which the nitric acid component can be directly recovered in the form of a vapor of nitric acid from a waste liquor containing a nitrate and nitric acid.

Other objects and advantages of the present invention will be apparent from the detailed description given hereinafter.

DETAILED DESCRIPTION OF THE PREFERRED EMBODIMENT

The process of the present invention can be applied to recovery of nitric acid from various waste nitric acids and nitrates. As the waste nitric acid, there can be mentioned waste nitric acids discharged from acid treatments of various minerals or slags or from acid extraction treatments.

For example, in the industry of manufacturing activated clay or activated silicic acid by subjecting a montmorillonite clay such as acid clay to an acid treatment to extract all or parts of basic components such as iron, magnesium, calcium and aluminum contained in the clay, a large quantity of a waste acid is formed as a by-product. When nitric acid is used for this acid treatment, free nitric acid and nitrates of the above-mentioned basic components are contained in the waste nitric acid. Such waste nitric acid may be subjected to the treatment of the present invention as it is or after the basic metal components have been separated by known means. For example, when waste nitric acid formed as a by-product in the acid treatment of a clay is subjected to known separation means such as adjustment of the pH 3 to 8, an aluminum component and/or an iron component is precipitated in the form of a hydroxide or basic nitrate as a simple substance or complex, if desired. A solution comprising calcium nitrate as the main component, which is obtained by separating the above precipitate, may be subjected to the treatment of the present invention.

Waste nitric acid formed in the process for preparing a concentrate of a titanium-containing material by adding a flux composed mainly of an alkali metal nitrate or alkali metal hydroxide to a titanium-containing mineral such as ilmenite, sand iron slag, high titanium slag or rutile ore, heating and fluxing the mineral and subjecting the resulting fluxing reaction product to an extraction treatment with an aqueous medium and/or an extraction treatment with nitric acid may also be subjected to the treatment of the present invention.

Still further, waste nitric acid formed as a by-product in the acid washing treatment of metals or the nitration treatment of organic compounds can be subjected to the treatment of the present invention.

Any of nitrates capable of thermal decomposition can be treated in the present invention. For example, there can be used nitrates of alkaline earth metals such as calcium, magnesium, barium and strontium, zinc, cadmium, aluminum, lead, and other polyvalent metals such as titanium, zirconium, tin, chromium, manganese, molybdenum, iron, cobalt and nitrate. Calcium nitrate is most preferred as the nitrate.

As the inorganic carrier that is used for fixing waste nitric acid or a nitrate in the form of a granule, there can be mentioned any of inorganic substances having an oil-absorbing property. In general, it is preferred that the inorganic substance to be used as the carrier be characterized by an oil-absorbing capacity of at least 20 ml/100 g, especially at least 40 ml/100 g, as measured in the powdery state. Suitable examples of the inorganic substance as the carrier include oxides, hydroxides, carbonates, basic carbonates, bicarbonates and silicates (inclusive of basic silicates) of the above-mentioned polyvalent metals, e.g., alkaline earth metals such as calcium, magnesium, barium and strontium, zinc, cadmium, aluminum, lead, titanium, zirconium, tin, chromium, manganese, molybdenum, iron, cobalt and nickel, and silicic acid.

The metal component of the inorganic carrier may be the same as or different from the metal component of the nitrate to be supported on the inorganic carrier. In general, it is preferred that the metal component of the inorganic carrier be the same as the metal component of the nitrate. Especially preferred carriers that are used in the present invention are calcium type carriers such as slaked lime, unslaked lime, calcium carbonate, calcium silicate and mixtures thereof.

In the present invention, waste nitric acid is incorporated or absorbed in the organic carrier to form a nitrate-carrier granule. For formation of this granule, it is important that the inorganic carrier should contain a basic component in an amount larger than the stoichiometric equivalent to free nitric acid present in the waste nitric acid. More specifically, when free nitric acid is present in the formed nitrate-carrier granule, the nitric acid is separated in the form of a nitrogen oxide gas ($NO_x$) rather than in the form of a vapor of nitric acid, and the intended objects of the present invention cannot be advantageously attained.

When the nitrate-carrier granule is formed by incorporating and absorbing waste nitric acid or a nitrate in the above-mentioned carrier, the ratio of the nitrate to the carrier in the granule should be determined so that (1) the granule is kept in the substantially non-sticky state at the decomposition temperature of the nitrate and (2) water should be contained in the form of a hydroxide, a hydrate or adsorption moisture in an amount sufficient to generate a vapor of nitric acid stably.

When a nitrate per se is heated, as shown in run 1—1 of Example 2, the nitrate is molten at the decomposition temperature or a lower temperature, and it becomes sticky and it is impossible to perform the thermal decomposition operation smoothly. The mixing ratio of the nitrate and inorganic carrier is changed in a relatively broad range depending on the kinds of the nitrate and carrier. However, in order to attain the above object (1), it is generally preferred that in the resulting granule, the carrier be present in an amount of at least 50% by weight, especially at least 60% by weight, as the oxide based on the nitrate as the anhydride. Incorporation of too large an amount of the carrier in the granule results in disadvantages in connection with the heat economy and the handling of the granule, and if a hydroxide is chosen as the inorganic carrier, when the amount of the hydroxide as the carrier is increased, the concentration of recovered nitric acid is reduced and no good results can be obtained. In view of the foregoing, it is preferred that in the granule the carrier be present in an amount smaller than 500% by weight, especially smaller than 350% by weight, based on the nitrate.

In order to recover pure nitric acid substantially free of $NO_x$ gas in the form of a vapor at the step of recovering the nitric acid component, it is important that water should be included in the form of a hydroxide, a hydrate or adsorption moisture in the nitrate-carrier granule. This water component is present in the form of water of crystallization in the nitrate and/or carrier, a hydroxide in the carrier or a basic nitrate. In the instant specification, such water is collectively called "chemically bonded water". Of course, adsorption moisture (called "physically bonded water") is contained in the nitrate-carrier granule used in the present invention as well as the above-mentioned chemically bonded water.

As will be apparent from results of runs 3-17 and 3-18 of Example 4 given hereinafter, when no water is present in the nitrate-carrier granule (anhydrous calcium nitrate-calcium carbonate granule or anhydrous calcium nitrate-magnesium carbonate carrier), the nitric acid component fixed in the granule is generated and separated in the form of $NO_x$ gas at the thermal decomposition step. Further, as will be apparent from results of runs 3-15 and 3-16 of Example 4 given hereinafter, when free water is contained in the nitrate-carrier granule only as impregnation water (anhydrous barium nitrate-crystalline alumina or anhydrous barium nitrate-crystalline titanium oxide), water is set free and evaporated prior to the thermal decomposition of the nitric acid component and it is difficult or impossible to recover the nitric acid component in the form of a vapor of nitric acid.

In contrast, according to the present invention, by making water present in the nitrate-carrier granule in the form of chemically bonded water or physically bonded water, it is made possible to supply water necessary for stable generation of a vapor of nitric acid. Referring, for example, to the case of the calcium nitrate-calcium hydroxide granule, this will readily be understood from the fact that the dehydration decomposition temperature of calcium hydroxide (500° to 620° C.) is very close to the thermal decomposition temperature of a nitrate (about 560° C. in case of calcium nitrate). It has not been completely elucidated how water contained in the nitrate in the form of water of crystallization will make contributions to the above reaction, but it is considered that water of crystallization will probably be maintained even at the decomposition temperature of the nitric acid radical or water of crystallization will probably be absorbed in a carrier such as lime to form calcium hydroxide and this calcium hydroxide make contributions to the above reaction.

The theoretical minimum quantity of water necessary for recovering the nitrate in the form of a vapor of nitric acid is represented by the following reaction formulae:

$$M(NO_3)_n + n/2 H_2O \rightarrow nHNO_3 \uparrow + MO_{n/2} \quad (1)$$

$$M(NO_3)_n + nH_2O \rightarrow nHNO_3 \uparrow + M(OH)_n \quad (2)$$

wherein M stands for a polyvalent metal and n stands for the valency of the polyvalent metal M.

In order to recover the nitric acid component stably in the form of a vapor of nitric acid, it is important to inhibit decomposition of the generated vapor of nitric acid and obtain the generated nitric acid vapor in the form of liquid nitric acid effectively without loss. For this purpose, it is preferred that at least 32% by weight, especially at least 40% by weight, of excessive water be present in generated nitric acid (HNO₃).

From the foregoing, in the present invention it is preferred that at least 2.18 moles, especially at least 2.8 moles, of chemically or physically bonded water be present in the nitrate-carrier granule per mole of the nitric acid radical (NO₃). However, if chemically or physically bonded water is present too excessively in the nitrate-carrier granule, the concentration of generated HNO₃ is too low. Therefore, it is preferred that the amount of chemically or physically bonded water contained in the nitrate-carrier granule be up to 8.6 moles, especially up to 4.0 moles, per mole of the nitric acid radical (NO₃).

Various methods may be adopted for mixing waste nitric acid or a nitrate with an inorganic carrier to form a granule. For example, when the amount of waste nitric acid or a nitrate solution to be treated is relatively small as compared with the amount of the carrier to be used, the waste nitric acid or nitrate solution is absorbed or impregnated in the powdery or granular carrier to form directly a granule to be subjected to the thermal decomposition. When the amount of the waste nitric acid or nitrate solution to be treated is relatively large as compared with the amount of the carrier to be used, the waste nitric acid or nitrate solution is mixed with the carrier, and the mixture is dried as it is or after molded into a granule, to form a nitrate-carrier granule to be subjected to the thermal decomposition.

In each case, water in an amount necessary for stable formation of a vapor of nitric acid is included in the resulting granule in the form of chemically bonded water or physically bonded water.

When a nitrate to be treated is solid, a powder of the carrier is mixed with a powder of the nitrate according to a dry method (utilizing the moisture-absorbing property of the nitrate) or a wet method to form a granule to be subjected to the thermal decomposition.

Further, a method utilizing such a property of a solid hydrous nitrate that the nitrate is molten at a relatively low temperature (250° to 350° C. in case of calcium nitrate tetrahydrate) may be adopted. More specifically, a carrier is added to a melt of such hydrous nitrate, and the mixture is stirred to form a nitrate-carrier granule.

Mixing of a carrier with waste nitric acid may be accomplished in one stage or two stages. For example, a carrier containing a basic component (oxide, hydroxide, carbonate, silicate or the like) in an amount substantially equivalent to the amount of free nitric acid in waste nitric acid is mixed with the waste nitric acid to convert free nitric acid to a nitrate, and the so formed nitrate solution is mixed with an additional amount of the carrier.

From the viewpoint of facillitating the operation, in the present invention it is preferred that a mixture of the carrier with the waste nitric acid or the nitrate be molded into a granule having a size of 0.01 to 15 mm, specially 0.05 to 10 mm. For this molding, any of known granulation means such as extrusion granulation, spray-drying granulation, shaking granulation, pulverizing granulation, rolling granulation and compression granulation can be adopted appropriately depending on the state and condition of the mixture.

According to the present invention, the so obtained granule is heated while keeping the granule in the substantially non-sticky state, whereby the nitrate in the granule is thermally decomposed to generate a vapor of nitric acid.

The granule should be heated at a temperature higher than the decomposition temperature of the nitrate contained in the granule. The decomposition temperature of the nitrate differs according to the kind of the nitrate, but in general, nitrates decompose at temperatures in the range of from 60 to 750° C., especially from 200 to 600° C.

Suitable temperatures for thermal decomposition of typical instances of nitrates are as shown in Table A.

Table A

| Nitrate | Temperature (°C.) |
|---|---|
| barium nitrate | 560–600 |
| strontium nitrate | 560–600 |
| copper nitrate | 150–200 |
| calcium nitrate | 540–600 |
| magnesium nitrate | 300–450 |
| nickel nitrate | 120–200 |
| aluminum nitrate | 140–250 |
| iron nitrate | 60–150 |
| sodium nitrate | 740–800 |

The heat treatment of the granule may be performed batchwise, but in order to utilize fully the advantage that thermal decomposition of the nitrate can be accomplished while keeping the original state of the granule, it is preferred that the heat treatment be carried out in a continuous manner. A thermal decomposition furnace of any type, for example, a thermal decomposition furnace of the moving or fluidized bed type or the fixed bed type, can be used for the thermal decomposition. As suitable examples of the furnace of the former type, there can be mentioned external heating or electric heating rotary furnaces multi-staged bed type calcination furnaces and vertical furnaces.

In order to introduce promptly a vapor of nitric acid generated by the thermal decomposition of the nitrate into the recovery system from the thermal decomposition furnace without leakage of the vapor, it is possible to such the nitric acid vapor by a fan or the like and maintain the pressure of the inside atmosphere of the thermal decomposition furnace at a level slightly lower than the pressure of the outer atmosphere, or to flow a carrier gas through the thermal decomposition furnace.

The thermal decomposition of the nitrate advances very promptly at the above-mentioned temperature, and therefore, the residence time of the granule in the thermal decomposition furnace is relatively short and good results are obtained if the residence time is 2 to 60 minutes.

At the heat treatment of the granule, blowing takes place in the granule with generation of the nitric acid vapor and it comes to have a porous granular structure. However, according to the present invention, throughout the heat treatment the granule is kept in the non-sticky state and therefore, operations of discharging the calcination residue from the furnace and moving the granule in the furnace can be remarkably facilitated. Moreover, separation of the calcination residue and the gas (nitric acid vapor) generated by the calcination can be accomplished very easily.

Any of known means such as cooling condensation and absorption accompanied by the gas absorbing reaction can be adopted for recovery of the so generated nitric acid vapor. For example, the nitric acid vapor is contacted with an absorbing medium such as water or nitric acid, and the vapor is recovered in the form of nitric acid. More specifically, the nitric acid vapor is contacted with water countercurrently or in parallel, and concentrated nitric acid can be recovered. Further, the nitric acid vapor is contacted in a multi-staged manner first with concentrated nitric acid, then with dilute nitric acid and finally with water, whereby all the nitric acid vapor generated can be recovered in the liquid form.

According to the present invention, there can be attained an advantage that since nitrogen in the nitrate is separated in the form of a nitric acid vapor by decomposition, substantially all of the generated vapor can be collected. When nitrogen dioxide gas is absorbed in water, only ⅔ of the gas is theoretically recovered in the form of nitric acid and the remaining one-third of the gas is converted to nitrogen suboxide (NO). In contrast, according to the present invention, at least 90% especially at least 97%, of the generated nitric acid vapor can be recovered by a relatively simple absorption system. This is one of prominent advantages attained by the present invention.

The gas left after recovery of nitric acid from the gas generated by the thermal decomposition contains a small amount of $NO_x$ gas, but when this residual gas is contacted with a known $NO_x$-absorbing agent or the gas is passed through a denitration apparatus, discharge of $NO_x$ into open air can be prevented.

The solid reside left after the thermal decomposition comprises oxides, hydroxides, silicates or carbonates of one or more of metals, or a mixture thereof. The calcination residue comprising a metal oxide or the like may be recycled to the step of preparing the above-mentioned granule, or it can be used as a raw material for the metal smelting, as a subsidiary raw material for manufacture of iron, or as a raw material for production of cement, gypsum, a drying agent, a neutralizing agent, a smoke-desulfurizing agent, calcium carbonate or other inorganic chemicals.

The residue comprising oxides of two or more of metals may be recycled to the step of preparing the above-mentioned granule, or it can be applied to various uses such as mentioned above at it is or after it has been separated into respective metal oxides according to need.

The process of the present invention can be preferably practised by using an apparatus for recovery of nitric acid which comprises a rotary furnace for calcining a granule formed by mixing waste nitric acid or a nitrate with a carrier, a cooler for cooling a vapor of nitric acid generated from said granule in the rotary furnace to condensate at least a part of the nitric acid vapor to liquid nitric acid, at least one absorption column for contacting the uncondensed vapor from said cooler with an absorbing medium composed of water or nitric acid countercurrently to recover at least a part of the uncondensed vapor, a denitration column for contacting the waste gas from the absorption column with alkaline aqueous solution countercurrently to absorb the remaining nitric acid vapor and $NO_x$ gas in the waste gas into the alkaline aqueous solution, and a concentrating device for concentrating the nitric acid recovered from said cooler and absorption column by heating, wherein the nitric acid vapor or water vapor from said concentrating device is mixed with the nitric acid vapor from the rotary furnace and the resulting gaseous mixture is introduced into said cooler.

One embodiment of the nitric acid recovery process of the present invention will now be described by reference to the flow sheet of FIG. 1.

A granule A formed by mixing waste nitric acid or a nitrate with a carrier is fed into a rotary electric furnace 1 from the introduction side end thereof. A calcination gas B (nitric acid vapor) generated by calcination in the furnace 1 is introduced into a cooler 3 through a cyclone 2. The residue left after generation of the nitric acid vapor still retains a granular form without mutual adhesion among particles of the granule, and the granule is recovered in the form of an oxide (I) of the metal used from the furnace 1. Separately, a nitric acid-concentrating vessel 6 is disposed, and a nitric acid vapor or water vapor B' generated from this concentrating vessel 6 is introduced into the cooler 3. The vapor B is mixed with the vapor B' in the mixing zone of the cooler 3, and a part of the resulting gaseous mixture is condensed in the form of nitric acid by cooling. The uncondensed vapor from the cooler 3 is introduced to the bottom of an absorption column 4 and it is then contacted with an absorbing medium composed of water or nitric acid countercurrently. The uncondensed vapor from the top of the absorption column 4 is introduced to the bottom of a cooling absorption column 5 where the vapor is contacted with an absorbing medium composed of water or nitric acid. Nitric acid recovered from the bottoms of the cooler 3, absorption column 4 and cooling absorption column 5 is received in a store tank 7, and a part of the stored nitric acid is fed and recycled as an absorbing medium to the absorption column 4 and cooling absorption column 5 by means of a pump while another part of the stored nitric acid is fed to the concentrating vessel 6. Concentrated nitric acid C is recovered from the concentrating vessel 6. According to need, water D is supplied as an absorbing medium to the store tank 7. A plurality of store tanks 7 may be disposed as accessory equipments of the cooler 3, absorption column 4 and cooling absorption column 5, so that the nitric acid vapor is contacted in succession with nitric acid solutions where the concentration is gradually reduced. The nitric acid recovered from the cooler 3, absorption column 4 and cooling absorption column 5 is concentrated by the concentrating vessel 6, and a vapor from the concentrating vessel 6 is mixed with the nitric acid vapor from the furnace 1 and the resulting gaseous mixture is fed to the cooler 3, whereby recovery of nitric acid can be performed very smoothly at a high efficiency and all of nitrogen contained in the waste nitric acid or nitrate can be recovered substantially completely in the form of nitric acid. In fact, by adoption of this absorption system, it is possible to recover at least 90%, especially at least 97% of the nitric acid vapor.

The waste gas from the top of the cooling absorption column 5 is introduced into a mist separator 9 to remove nitric acid mists therefrom, and the gas is then introduced into a denitration column 8 where the gas is contacted with lime milk countercurrently to absorb the remaining nitric acid vapor or $NO_x$ gas in the waste gas into the lime milk. The waste gas from the denitration column 8 is then introduced into a mist separator 10 to remove mists therefrom and is discharged as a harmless gas E by means of a fan F. Lime milk G is supplied to a store tank 11 for recycling lime milk to the denitration column 8, and calcium-containing lime milk H is used for the preparation of the granule A and the nitric acid component contained therein can be finally recovered. When the metal oxide (I) discharged from the discharge side end of the electric furnace 1 is unslaked lime, at least a part thereof is utilized for the preparation of the granule A and the remainder is applied to various uses such as mentioned above.

As will be apparent from the foregoing illustration, according to the present invention, nitric acid contained in waste nitric acid or a nitrate can be recovered substantially completely in the form of nitric acid by the thermal decomposition and the condensation or absorption, and furthermore, the thermal decomposition can be performed continuously and none of industrial wastes are formed. Thus, various prominent advantages can be attained by the present invention.

The present invention will now be described in detail by reference to the following Examples that by no means limit the scope of the invention.

EXAMPLE 1

This Example illustrates a process for recovering nitric acid from waste nitric acid formed when a blast furnace slag is treated with nitric acid.

PRETREATMENT

A blast furnace slag having the following composition was subjected to the following pretreatment for the purpose of desulfurization.

| Component | Content (% by weight) |
| --- | --- |
| CaO | 40.9 |
| $Al_2O_3$ | 14.6 |
| $SiO_2$ | 35.4 |
| MgO | 5.8 |
| $TiO_2$ | 0.6 |
| $Fe_2O_3$ | 0.6 |
| MnO | 0.7 |
| S | 0.8 |
| ignition loss | 0.6 |

In a ball mill having an inner capacity of 50 l was charged 10 Kg of a roughly pulverized product of the above-mentioned blast furnace slag together with 15 l of water, and the slag was pulverized for 6 hours to form a slurry completely passing through a 300-mesh sieve (the recovery ratio of the slag being 99.5% by weight). The slurry was then transferred to a vessel having an inner capacity of 80 l and equipped with a stirrer, and lime was added thereto in an amount of 6% by weight based on the slag. The mixture was heated and aged under agitation at 85° C. for 1 hour. Then, the mixture was filtered under reduced pressure to separate a cake (A). The cake was washed with 6 l of a saturated aqueous solution of lime and a mother liquor (A) was thus recovered in a total amount of about 20 l. In order to separate and recover the sulfur component dissolved in the mother liquor (A), 10 ml of aqueous hydrogen peroxide (30%) was added to the mother liquor (A) and the mixture was heated and aged at 85° C. for 10 minutes, and the precipitated sulfide was separated by reduced pressure filtration. The so obtained filtrate substantially free of sulfur and the above-mentioned filter cake (A) were transferred to the same vessel equipped with a stirrer, and the mixture was heated and aged at 85° C. for 30 minutes and then filtered. The recovered cake was washed with about 6 l of a saturated aqueous solution of lime to recover a cake (B) of the blast furnace slag powder substantially free of sulfur and 20 l of a mother liquor (B). When the sulfur content in the cake (B) was determined, it was found that the sulfur content was 4 ppm.

NITRIC ACID TREATMENT

The so obtained blast furnace cake was used as the starting material and was treated with nitric acid according to the following method.

The undried cake (B) was formed into a homogeneous slurry together with 7 l of water in a vessel equipped with a high-speed stirrer, and concentrated nitric acid (65% by weight) was gradually added under high-speed agitation to the slurry, the amount of nitric acid added being 0.85 equivalent to all the basic components contained in the slurry. The temperature of the slurry was elevated to 70° to 85° C. by violent reaction and self-heat generation, and accordingly, aging was continued in this state under agitation for 15 minutes. The slurrylike aging reaction product was cast into a stainless steel vat and dried at 150° C. for 2 to 6 hours (the water content was reduced below 1%). Then, the dried product was thrown into 15 l of water, and the mixture was heated at 60° C. for 0.5 to 1 hour under agitation to effect extraction. Then, the mixture was filtered under reduced pressure and then washed, whereby the mixture was separated into a fine powder of aluminosilicic acid valuable as a filler or the like and waste nitric acid containing calcium nitrate, aluminum nitrate and manganese nitrate.

TREATMENT OF WASTE NITRIC ACID

Powdery slaked lime was added to the above waste nitric acid to adjust the pH of the waste nitric acid to 5, whereby the aluminum component was completely precipitated in the form of a hydroxide. The so formed hydroxide was separated by filtration and washed. The aluminum recovery ratio was 38% based on the blast furnace slag.

The filtrate and washing liquor were combined, and powdery slaked lime was added to the mixture to adjust the pH to 10, whereby the manganese component was precipitated in the form of a brown hydroxide. The hydroxide was separated by filtration and then washed. The manganese recovery ratio was 100% based on the blast furnace slag.

The filtrate left after removal of the manganese component was colorless and transparent, and about 20 Kg (calculated as the anhydride) of calcium nitrate was contained in the sum of the filtrate and washing liquor (hereinafter referred to merely as "filtrate").

Then, 60 l of the filtrate was concentrated so that the volume was reduced to 30 l, and the concentrate and 31 Kg of slaked lime were charged into a kneading granulator of the vertical screw type and the mixture was kneaded and extruded into granules having a diameter of 5 mm.

Results of the analysis of the so-obtained lime-nitrate granule are as follows:

| Component | Content (% by weight) |
| --- | --- |
| $Ca(NO_3)_2$ | 33.7 |
| CaO | 39.0 |
| $H_2O$* | 27.3** |

*The amount of $H_2O$ was determined as the value obtained by subtracting the amounts of the product (CaO) formed by calcination at 590° C. and the nitric acid residue from the total amount of the granule. Accordingly, this amount includes the amounts of water contained in calcium hydroxide and water contained in calcium nitrate in the form of water of crystallization.
**This amount of water corresponds to 3.69 equivalents to calcium nitrate (anhydride) as calculated according to the above-mentioned formula (1).

RECOVERY OF NITRIC ACID

Figure 1:
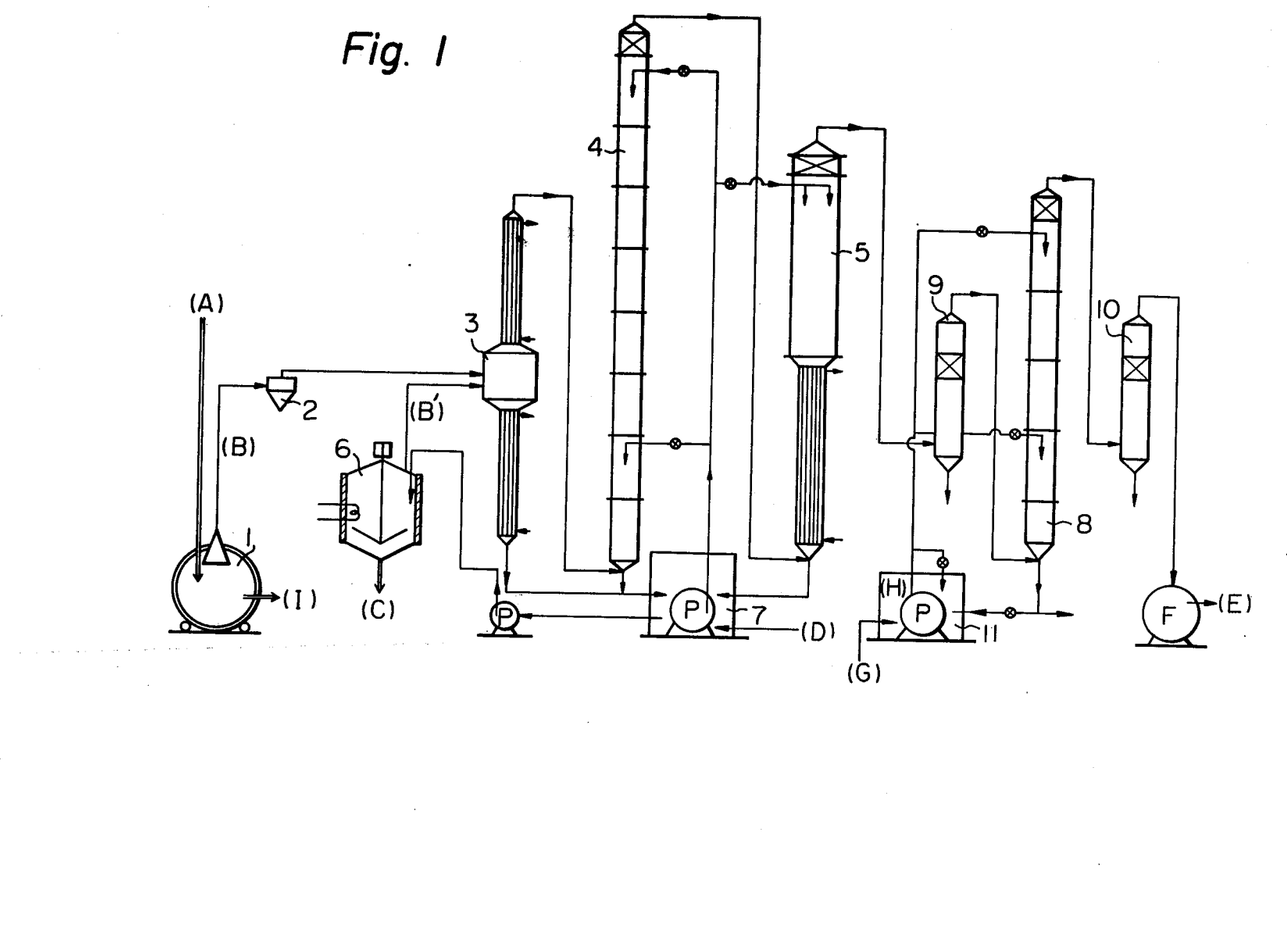
FIG. 1 is a flow sheet illustrating one embodiment of the nitric acid recovery process of the present invention.

By using the nitric acid recovery system illustrated in FIG. 1, nitric acid was recovered from the so formed lime-nitrate granule.

An electric heater-installed rotary furnace having an inner diameter of 30 cm and a length of 1.7 m and including a material of furnace composed of a commercially available fire-resistant cement was rotated at 2 rpm, and the lime-nitrate granule was fed at a rate of 950 Kg/min from an introduction opening of the rotary furnace. The residence time of the granule in the furnace was about 10 to about 15 minutes. The heater was controlled so that the granule was heated at 600° C. at highest. Blowing took place in the lime-nitrate granule at about 500° C. and generation of a nitric acid vapor was observed, but adhesion of the granule to the furnace wall was not observed at all.

The gas (nitric acid vapor) generated by the thermal decomposition was introduced into the cooler, absorption column and cooling absorption column shown in FIG. 1 to recover nitric acid. At first, 100 l of 40% nitric acid was charged in a concentrating vessel and was heated at the boiling point to generate a nitric acid vapor. This vapor was mixed with the thermal decomposition product gas in the cooler, and the mixture was cooled to 30° to 40° C.

In a store tank, 100 l of dilute nitric acid having a concentration of 30% was charged as an absorbing medium and this liquid was supplied at a flow rate of 1200 l/hr into the absorption column and at a flow rate of 800 l/hr into the cooling absorption column and was caused to flow down in each column. The gas from the cooler was contacted with the absorbing medium at 40° to 110° C. in the absorption column, and in the cooling absorption column, the gas was contacted with the absorbing medium at 20° to 30° C. under forced water cooling.

At the time of completion of the thermal decomposition, 157 l of nitric acid having a concentration of 32.5% by weight was recovered in the store tank, and the nitric acid in the concentrating vessel was concentrated to 50 l of nitric acid having a concentration of 57% by weight. The nitric acid recovery ratio calculated from the above material blance was 97.6%. From an exit of the rotary furnace there was recovered 30 Kg of calcium oxide in the form of a foamed granule.

The waste gas from the cooling absorption column was contacted with lime milk having a concentration of 10% and fed at a rate of 1000 l/hr in the denitration column, and then, the gas was discharged into open air by means of a fan. The nitrogen oxide concentration in the discharged gas was below 20 ppm.

From the above-illustrated Example, it will readily be understood that according to the present invention, by using lime as a carrier for the thermal decomposition of a nitrate, substantially all of nitric acid used for the acid treatment can be recovered at a very high recovery ratio in the form that can readily be used again, while keeping the nitrate-carrier mixture in the form of a non-sticky granule that can be handled very easily, without substantial melting of the nitrate-carrier granule. Moreover, the lime used as the carrier can be used repeatedly.

EXAMPLE 2

This Example illustrates that in order to keep a nitrate-carrier granule in the non-sticky state at the thermal decomposition of the nitrate-carrier granule, the amount of the carrier such as lime is very important, and in order to recover nitric acid stably, the amount of the hydroxide in the nitrate-carrier granule is very important.

At first, 60 g of slaked lime was added to 200 ml of nitric acid having a concentration of 40% to convert nitric acid completely to calcium nitrate, and then, slaked lime was further added as an inorganic carrier in an amount of 40 to 350% by weight based on the so formed calcium nitrate (as the anhydride). In Table 1, run 1-1 where slaked lime was incorporated in an amount of 40% by weight is a comparative run conducted to clarify the effects of the present invention. Then, the mixture was sufficiently kneaded and then granulated by a granulator as it was or under heating according to need, whereby a lime-nitrate granule was prepared.

The lime-nitrate granule was heat-treated in an electric furnace maintained at 100° to 600° C. for 1 hour, and the shape and condition of the granule were examined to obtain results shown in Table 1.

Each of the lime-nitrate granules differing in the mixing ratio (% by weight) was heat-treated at 560° C. to recover a nitric acid vapor. Data of the concentration of the recovered nitric acid and the nitric acid recovery ratio are shown in Table 1.

granule having a size of about 1 to about 5 mm, and the wet granule was dried at a low temperature of 20° to 40°

Table 1

| Run No. | Mixing Ratio (% by weight) of Carrier (as oxide) | Calcination Temperature (°C.) | | | | | | Concentration (%) of Recovered Nitric Acid | Nitric Acid Recovery Ratio (%) |
| --- | --- | --- | --- | --- | --- | --- | --- | --- | --- |
| | | 100 | 200 | 300 | 500 | 560 | 600 | | |
| 1-1 (comparison) | 40 | C | B | A | A | A | A | 33.6 | 64.8 |
| 1-2 | 60 | C | C | B | B | C | C | 56.5 | 90.5 |
| 1-3 | 75 | C | C | B | C | C | C | 53.0 | 95.6 |
| 1-4 | 113 | C | C | C | C | C | C | 48.5 | 93.4 |
| 1-5 | 136 | C | C | C | C | C | C | 50.5 | 98.4 |
| 1-6 | 151 | C | C | C | C | C | C | 43.0 | 97.6 |
| 1-7 | 350 | C | C | C | C | C | C | 35.4 | 98.5 |

Note
A: molten
B: semi-molten
C: non-sticky granule

From the experimental results shown in Table 1, it will readily be understood that when slaked lime is incorporated in an amount of at least 50% by weight as calcium oxide into calcium nitrate and the mixture is formed into a granule, even if the temperature is elevated to 560° C., the decomposition temperature of calcium nitrate, the granule is not molten into the liquid form but the non-sticky state can be maintained, and a nitric acid vapor is generated in a high yield by the thermal decomposition without generation of $NO_x$ gas and nitric acid can thus be recovered very easily at a high efficiency. In contrast, when the amount incorporated of slaked lime is 40% by weight as in run 1-1, the lime-nitrate granule is molten at about 300° C., and the melt adheres to the wall of the electric furnace and handling of the mixture becomes difficult from the industrial viewpoint. Further, in this case, the nitric acid recovery ratio is as low as 65% and the process cannot be practised on an industrial scale. When the amount incorporated of slaked lime is too large, because of increase of the amount of water possessed by slaked like (the amount of hydroxyl groups), the concentration of recovered nitric acid is low and the process becomes disadvantageous from the industrial viewpoint.

EXAMPLE 3

This Example illustrates embodiments in which nitric acid is recovered from various granules comprising a polyvalent metal nitrate and a hydroxide hydrate carrier by thermal decomposition thereof.

As the polyvalent metal salt there were chosen and used various nitrates containing water of crystallization or free of water of crystallization, as shown in Table 2.

Various commercially available metal hydroxides and hydrates having an oil-absorbing capacity of at least 15 ml/100 g, as shown in Table 2, were chosen and used as the hydroxide or hydrate carrier.

The nitrate and carrier were mixed at a mixing ratio shown in Table 2 and 30 g of the mixture was kneaded under agitation in the presence of a small amount of water in a mortar. The mixture was formed into a wet C. to form a nitrate-carrier granule.

Figure 2:
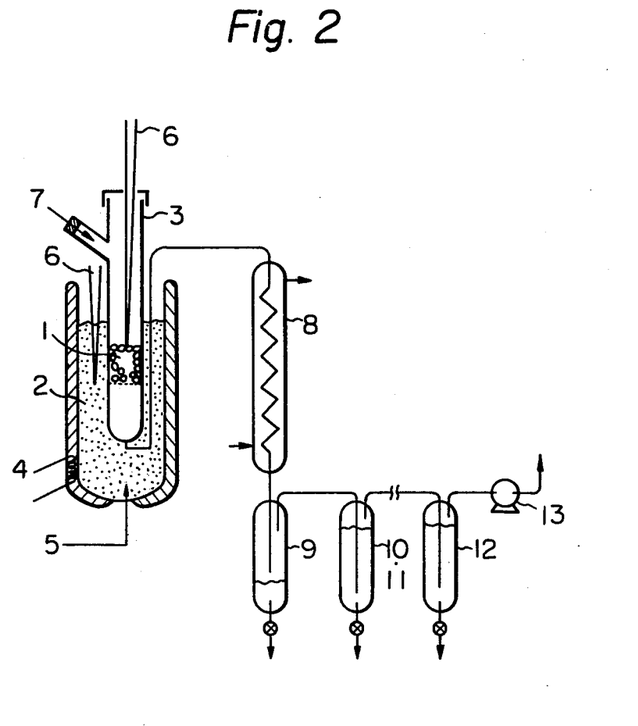
FIG. 2 is a diagram illustrating the arrangement of an experimental apparatus used in Example 3.

Then, the nitrate-carrier granule was subjected to thermal decomposition by using an experimental vertical stainless steel reaction tube shown in FIG. 2, and nitric acid generated by the thermal decomposition was recovered in lime milk and the concentration of the recovered nitric acid and the nitric acid recovery ratio were determined to obtain results shown in Table 2.

The reaction procedures will now be described in detail by reference to FIG. 2.

A stainless steel tube 3 having a diameter of 35 mm was used as the reaction tube, and a perforated plate having a hole of a diameter of about 1 mm at the center thereof was placed in the reaction tube and a nitrate-carrier graunle 1 was put on this perforated plate. Microfine alumina gel balls 2 (having a diameter of 60 to 80 mesh) were charged around the reaction tube and these microfine alumina gel balls were heated by an electric heater 4 and simultaneously, the microfine alumina gel balls were fluidized by compressed air 5 so that the reaction tube was heated uniformly at a predetermined temperature. The temperature of the reaction tube was measured by a thermocouple 6. Nitric acid gas generated in the reaction tube by the thermal decompositon was introduced into a cooler 8 through a stainless steel pipe having a diameter of 4 mm and extended from the lower portion of the reaction tube. In the cooler 8, the generated nitric acid gas was cooled and recovered in a tube 9 for storing condensed nitric acid. The nitric acid concentraton (% by weight) of the so recovered nitric acid was measured. Further, nitric acid was recovered by absorption bottles 10 and 11 filled with aqueous nitric acid. The nitric acid recovery ratio (%) was calculated from the amount of the thus recovered nitric acid. The generated gas containing nitric acid was passed through an absorption bottle 12 filled with 5% aqueous lime and was introduced into the cooler and recovery pipe by the sucking action of a sucking pump 13. The determined recovered nitric acid concentration (% by weight) and nitric acid recovery ratio are shown in Table 2.

Table 2

| Run No. | Polyvalent Metal Nitrate (A) | Inorganic Carrier (B) | Amount (% by weight) of Carrier (B) as Oxide | Decomposition Temperature (°C.) | Nitric Acid Concentration (% by weight) | Nitric Acid Recovery Ratio (%) |
| --- | --- | --- | --- | --- | --- | --- |
| 2-1 | $Ba(NO_3)_2$ | $Mg(OH)_2$ | 150 | 560–600 | 48.9 | 89.6 |
| 2-2 | " | $Ca(OH)_2$ | 200 | 560–600 | 50.4 | 92.6 |
| 2-3 | " | $Zn(OH)_2$ | 250 | 560–600 | 54.6 | 88.7 |

Table 2-continued

| Run No. | Polyvalent Metal Nitrate (A) | Inorganic Carrier (B) | Amount (% by weight) of Carrier (B) as Oxide | Decomposition Temperature (°C.) | Nitric Acid Concentration (% by weight) | Nitric Acid Recovery Ratio (%) |
|---|---|---|---|---|---|---|
| 2-4 | " | Al(OH)$_3$ | 87 | 560–600 | 50.0 | 87.9 |
| 2-5 | Pb(NO$_3$)$_2$ | Ca(OH)$_2$ | 110 | 560–600 | 45.0 | 93.8 |
| 2-6 | " | Al(OH)$_3$ | 80 | 560–600 | 47.3 | 86.7 |
| 2-7 | " | TiO$_2$nH$_2$O | 90 | 500–600 | 48.0 | 81.6 |
| 2-8 | Sr(NO$_3$)$_2$ | Ca(OH)$_2$ | 200 | 600 | 58.4 | 89.4 |
| 2-9 | " | Sr(OH)$_2$ | 300 | 600 | 60.0 | 82.6 |
| 2-10 | " | Mg(OH)$_2$ | 150 | 600 | 53.4 | 85.9 |
| 2-11 | Cu(NO$_3$)$_2$·3H$_2$O | Cu(OH)$_2$ | 150 | 400–600 | 54.5 | 98.4 |
| 2-12 | " | Al(OH)$_3$ | 120 | 300–600 | 60.4 | 92.8 |
| 2-13 | " | Zn(OH)$_2$ | 140 | 200–600 | 53.1 | 96.4 |
| 2-14 | " | Ca(OH)$_2$ | 130 | 560–600 | 58.4 | 98.7 |
| 2-15 | Mg(NO$_3$)$_2$·6H$_2$O | Mg(OH)$_2$ | 200 | 400–600 | 40.5 | 98.4 |
| 2-16 | " | Ca(OH)$_2$ | 230 | 560–600 | 38.7 | 96.9 |
| 2-17 | " | Al(OH)$_3$ | 70 | 400–600 | 54.0 | 97.9 |
| 2-18 | Ni(NO$_3$)$_2$·6H$_2$O | Ni(OH)$_2$ | 230 | 300–600 | 40.1 | 100 |
| 2-19 | " | Ca(OH)$_2$ | 250 | 560–600 | 39.8 | 95.6 |
| 2-20 | " | Zn(OH)$_2$ | 240 | 200–600 | 38.7 | 100 |
| 2-21 | " | Mg(OH)$_2$ | 200 | 400–600 | 42.8 | 98.4 |
| 2-22 | " | Al(OH)$_3$ | 80 | 300–600 | 57.8 | 97.6 |
| 2-23 | Al(NO$_3$)$_3$·9H$_2$O | Al(OH)$_3$ | 55 | 300 | 58.4 | 100 |
| 2-24 | " | Ca(OH)$_2$ | 78 | 300–600 | 55.6 | 100 |
| 2-25 | " | Mg(OH)$_2$ | 56 | 350–600 | 50.1 | 100 |
| 2-26 | " | Ni(OH)$_2$ | 80 | 300–600 | 54.5 | 100 |
| 2-27 | Fe(NO$_3$)$_3$·9H$_2$O | Fe(OH)$_3$ | 300 | 300–600 | 50.7 | 100 |
| 2-28 | " | Ca(OH)$_2$ | 200 | 560–600 | 54.9 | 100 |
| 2-29 | " | Al(OH)$_3$ | 80 | 300–600 | 60.4 | 100 |
| 2-30 | Ti(NO$_3$)$_4$ | Ca(OH)$_2$ | 180 | 560–600 | 49.6 | 94.2 |
| 2-31 | " | Al(OH)$_3$ | 90 | 300–600 | 52.3 | 92.5 |
| 2-32 | Zr(NO$_3$)$_4$ | Ca(OH)$_2$ | 200 | 560–600 | 53.6 | 89.8 |
| 2-33 | " | Al(OH)$_3$ | 120 | 300–600 | 54.6 | 91.5 |

From the foregoing results, it will readily be understood that when nitrate-hydroxide granules shown in Table 2 thermally decomposed in a vertical reaction tube at predetermined temperatures, they are not molten into the liquid state but they are kept in the non-sticky granular state throughout the thermal decomposition. More specifically, if a granule is molten in the liquid state, the melt flows into the lower portion of the reaction vessel through the perforated plate and the intended object cannot be attained. However, in each of runs shown in Table 2, such flowing of the molten granule was not observed and the oxide of the metal used was left in the porous granule on the perforated plate after the thermal decomposition and generation of nitric acid.

Also from the results shown in Table 2, it is apparent that when various nitrate-hydroxide granules according to the present invention are thermally decomposed at predetermined temperatures (decompositon temperatures shown in Table 2), in each case a nitric acid vapor substantially free of NO$_x$ gas can be recovered at a very high recovery ratio.

EXAMPLE 4

This Example illustrates an embodiment in which nitric acid is recovered by thermal decompositon of various granules comprising a polyvalent metal nitrate and an oil-absorbing inorganic carrier.

As the polyvalent metal nitrate, there were chosen and used commercially available nitrates of barium, calcium, aluminum and iron indicated in Table 3.

As the oil-absorbing inorganic carrier, there were chosen and used commercially available titanium oxide gel (TiO$_2$), magnesium oxide (MgO), alumina gel (Al$_2$O$_3$), aluminosilicate (acid clay), calcium carbonate (CaCO$_3$), magnesium carbonate (MgCO$_3$) and silica gel (SiO$_2$) having an oil-absorbing capacity of 40 ml/100 g, shown in Table 3.

Nitrate-inorganic carrier granules were prepared according to the method described in Example 3 at nitrate/carrier mixing ratios shown in Table 3. More specifically, the nitrate and the inorganic carrier were mixed at a mixing ratio shown in Table 3, and in a mortar, about 30 g of the mixture was kneaded under agitation in the presence of a small amount of water to form a wet granule. The granule was dried at a low temperature of 20° to 40° C. to form a nitrate-carrier granule.

Then, each granule was heated at a predetermined temperature by using the experimental vertical stainless steel reaction tube shown in FIG. 2 to generate nitric acid by thermal decomposition. In the same manner as described in Example 3, the generated nitric acid was recovered. The recovered nitric acid concentration and the nitric acid recovery ratio were determined to obtain results shown in Table 3.

In Table 3, runs 3-15 and 3-16 are comparative runs in which only water used for formation of the nitrate-carrier granule by granulation was present in the granule as impregnation water, and also runs 3-17 and 3-18 are comparative runs in which water was not substantially present in the dried nitrate-carrier granule. These comparative runs are given so as to demonstrate the effects of the present invention clearly.

Table 3

| Run No. | Polyvalent Metal Nitrate (A) | Inorganic Carrier (B) | Amount (% by weight) of (B) as Oxide | Decomposition Temperature (°C.) | Nitric Acid Concentration (% by weight) | Nitric Acid Recovery Ratio (% by weight) |
|---|---|---|---|---|---|---|
| Present Invention | | | | | | |
| 3-1 | $Ca(NO_3)_2 \cdot 4H_2O$ | $Al_2O_3$ | 75 | 560–600 | 51.0 | 94.6 |
| 3-2 | " | $Al_2O_3$ | 80 | 560–600 | 38.0 | 96.4 |
| 3-3 | " | MgO | 170 | 560–600 | 34.5 | 95.4 |
| 3-4 | " | $SiO_2$(gel) | 150 | 560–600 | 54.3 | 93.5 |
| 3-5 | $Al(NO_3)_3 \cdot 9H_2O$ | $Al_2O_3$ | 70 | 300–600 | 63.4 | 100 |
| 3-6 | " | $TiO_2$(gel) | 250 | 300–600 | 61.5 | 100 |
| 3-7 | " | $SiO_2$(gel) | 120 | 300–600 | 60.4 | 100 |
| 3-8 | " | $CaO-SiO_2$ | 250 | 300–600 | 59.8 | 100 |
| 3-9 | " | $Al_2O-SiO_2$(acid clay) | 200 | 300–600 | 58.6 | 100 |
| 3-10 | " | $CaCO_3$ | 65 | 300–600 | 61.4 | 100 |
| 3-11 | $Fe(NO_3)_3 \cdot 9H_2O$ | $Al_2O_3$ | 85 | 200–600 | 61.5 | 100 |
| 3-12 | " | $SiO_2$(gel) | 130 | 200–600 | 62.8 | 100 |
| 3-13 | " | $MgCO_3$ | 250 | 200–600 | 58.9 | 100 |
| 3-14 | " | $Al_2O_3-SiO_2$ (acid clay) | 200 | 200–600 | 56.4 | 100 |
| Comparison | | | | | | |
| 3-15 | $Ba(NO_3)_2$ | $TiO_2$ | 150 | 600 | 0 | 49.5 |
| 3-16 | $Ba(NO_3)_2$ | $Al_2O_3$ | 150 | 600 | 0 | 56.4 |
| 3-17 | $Ca(NO_3)_2 \cdot 4H_2O$ | $CaCO_3$ | 150 | 560 | 0 | 54.8 |
| 3-18 | $Ca(NO_3)_2 \cdot 4H_2O$ | $MgCO_3$ | 170 | 560 | 0 | 85.0 |

From the foregoing results, it will readily be understood that even if a nitrate-carrier is prepared by using an oil-absorbing inorganic carrier other than a hydroxide, when water is retained at the step of generating nitric acid by thermal decomposition, the granule is not molten into the liquid state but it retains the non-sticky granular form throughout the thermal composition. Further, nitrogen oxides formed by the thermal decomposition are preferably recovered in the form of nitric acid while preventing substantial generation of $NO_x$ gas.

EXAMPLE 5

This Example illustrates another embodiment for preparing a nitrate-inorganic carrier by mixing a nitrate with an inorganic carrier.

Various commercially available nitrates shown in Table 4 were chosen and used as the polyvalent metal nitrate. When magnesium nitrate [$Mg(NO_3)_2 \cdot 6H_2O$] was used, the nitrate was allowed to deliquesce at room temperature. In case of aluminum nitrate [$Al(NO_3)_3 \cdot 6H_2O$], the nitrate was heated at 70° C. to convert it to a liquid. In case of copper nitrate [$Cu(NO_3)_2 \cdot 3H_2O$], the nitrate was liquefied by heating at 120° C. In case of barium nitrate [$Ba(NO_3)_2$], the nitrate was heated and molten at 400° C. to form a liquid. An inorganic carrier shown in Table 4 was added under stirring to the thus liquefied nitrate at a mixing ratio shown in Table 4 to form a granule.

In the same manner as described in Example 3, each granule was heated at a predetermined thermal decomposition temperature by using the experimental stainless steel reaction tube shown in Table 2 to generate nitric acid. The recovered nitric acid concentration and the nitric acid recovery ratio were determined to obtain results shown in Table 4.

Table 4

| Run No. | Polyvalent Metal Nitrate (A) | Inorganic Carrier (B) | Amount (% by weight) of (B) as Oxide | Temperature (°C.) at Mixing Step | Thermal Decomposition Temperature (°C.) | Nitric Acid Concentration (% by weight) | Nitric Acid Recovery Ratio (%) |
|---|---|---|---|---|---|---|---|
| 5-1 | $Mg(NO_3)_2 \cdot 6H_2O$ | $Ca(OH)_2$ | 250 | room temperature | 400–600 | 40.5 | 98.4 |
| 5-2 | $Mg(NO_3)_2 \cdot 6H_2O$ | $Al_2O_3$ | 80 | room temperature | 400–600 | 54.8 | 99.5 |
| 5-3 | $Al(NO_3)_3 \cdot 9H_2O$ | $Al_2O_3$ | 70 | 70 | 300–600 | 62.5 | 100 |
| 5-4 | $Zn(NO_3)_2 \cdot 6H_2O$ | $Ca(OH)_2$ | 230 | 70 | 200–600 | 38.6 | 95.9 |
| 5-5 | $Cu(NO_3)_2 \cdot 3H_2O$ | $Cu(OH)_2$ | 150 | 120 | 300–600 | 51.5 | 97.8 |
| 5-6 | $Ba(NO_3)_2$ | $Ca(OH)_2$ | 200 | 400 | 560–600 | 52.9 | 94.9 |
| 5-7 | $Ba(NO_3)_2$ | $Al_2O_3$ | 80 | 400 | 560–600 | 0 | 58.4 |

From the results shown in Table 4, it will readily be understood that even if the nitrate is liquefied by utilizing the deliquescent property or melting property under heating and an inorganic carrier powder is mixed with the liquefied nitrate to form a nitrate-carrier granule, when the granule is heated at a decomposition temperature necessary for generation of nitric acid, the granule is not molten to a flowing liquid at all but the non-sticky state can be maintained throughout the thermal decomposition. Accordingly, nitric acid can be generated in very good conditions and recovered at an optimum concentration and a high recovery ratio.

What we claim is:

1. A process for recovery of nitric acid comprising mixing an aqueous solution containing nitric acid and/or a nitrate with a dry powder of an oil-absorbing inorganic carrier having an oil-absorbing capacity of at least 20 ml/100 g and being selected from the group consisting of oxides, hydroxides, carbonates and silicates of polyvalent metals and silica with the proviso that when the aqueous solution contains only nitrate said inorganic carrier may be silica, to form a nitrate-carrier granule containing the carrier in an amount of 40 to 250 percent by weight as calculated as the oxide based on the anhydrous nitrate and water in the form of a hydroxide, a hydrate or adsorption moisture in an amount of 2.18 to 8.6 moles per mole of the nitric acid radical ($NO_3$) in the nitrate, heating the formed granule while keeping the substantially non-sticky state in the granule to decompose the nitrate in the granule to a vapor of nitric acid, and recovering the generated vapor of nitric acid.

2. A process for the recovery of nitric acid according to claim 1 wherein the nitrate-carrier granule contains water in the form of a hydroxide, a hydrate or absorption moisture in an amount of 2.18 to 4.0 moles per mole of the nitric acid radical ($NO_3$) in the nitrate.

3. A process for recovery of nitric acid according to claim 1 wherein the carrier is at least one member selected from the group consisting of calcium hydroxide, calcium oxide and calcium carbonate.

4. A process for recovery of nitric acid according to claim 1 wherein the nitrate is a polyvalent metal nitrate.

5. A process for recovery of nitric acid according to claim 1 wherein the nitrate is calcium nitrate.

6. A process for recovery of nitric acid according to claim 1 wherein the mixture of the aqueous solution of the nitrate with the carrier is dried and then formed into a granule.

7. A process for recovery of nitric acid according to claim 1 wherein a hydrous nitrate is molten at a temperature lower than the decomposition temperature thereof, the melt is mixed with the carrier and the mixture is formed into a granule.

8. A process for recovery of nitric acid according to claim 1 wherein the nitrate-carrier granule is heated at a temperature of 500° to 650° C.

9. A process for recovery of nitric acid according to claim 1 wherein the generated nitric acid vapor is cooled to a temperature lower than the condensing temperature thereof and is recovered in the form of nitric acid.

10. A process for recovery of nitric acid according to claim 1 wherein the generated nitric acid vapor is contacted with an absorbing medium composed of water or nitric acid and is recovered in the form of nitric acid.

* * * * *